J. J. LAHAYE.
Car-Couplings.
No. 153,089.
Patented July 14, 1874.
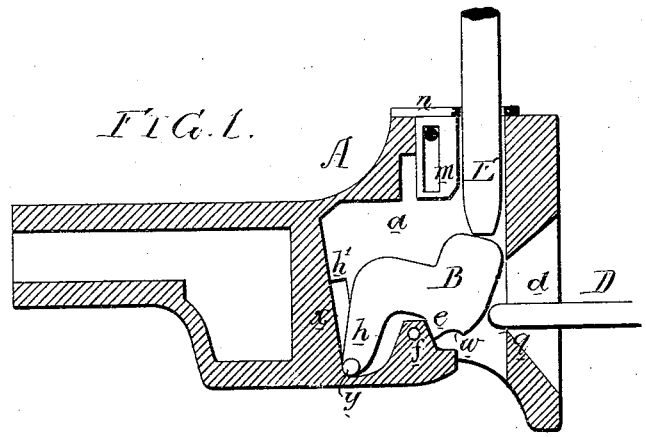
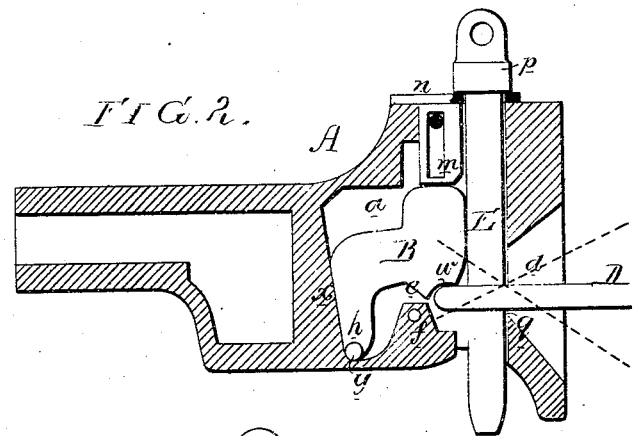
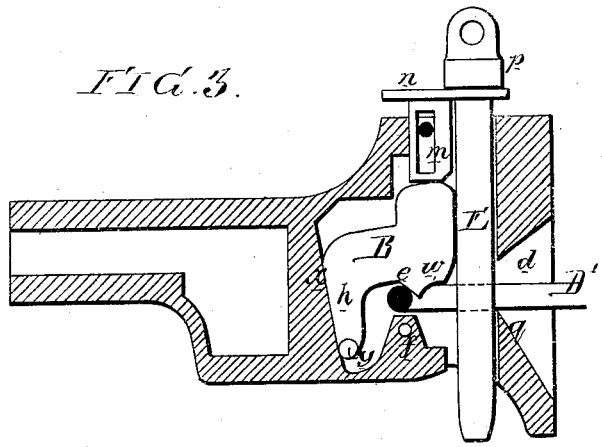
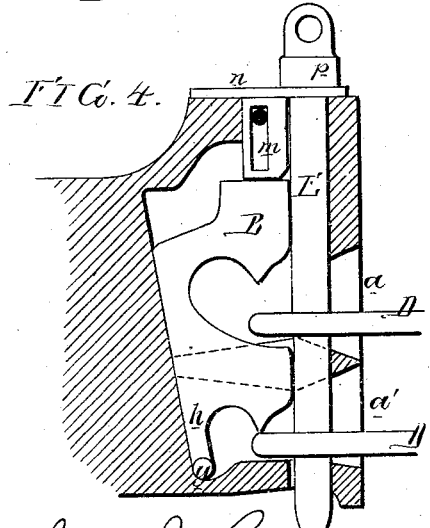
Witnesses,
Wm A. Steel
Thomas McIlvain
John J. Lahaye
By his Attys.
Howson and Son

UNITED STATES PATENT OFFICE

JOHN J. LAHAYE, OF READING, PENNSYLVANIA.

IMPROVEMENT IN CAR-COUPLINGS.

Specification forming part of Letters Patent No. 153,089, dated July 14, 1874; application filed April 6, 1874.

*To all whom it may concern:*

Be it known that I, JOHN J. LAHAYE, of Reading, Pennsylvania, have invented an Improved Car-Coupling, of which the following is a specification:

The main object of my invention is to so construct a car-coupling that the coupling-link will be retained in such a horizontal position as to obviate the necessity of performing the usual dangerous duty of raising the link of one car and guiding it into the coupling-head of an adjoining car, another prominent feature of my invention being the adaptation of the coupling to long and short links. These objects I attain in the manner which I will now proceed to describe, reference being had to the accompanying drawing, in which—

Figures 1, 2, and 3 represent my improved coupling in section, with the parts in different positions, and Fig. 4, a modification of my invention.

Within the coupling-head A is a chamber, $a$, containing the loose dog B, which is at liberty to assume either of the positions shown in Figs. 1, 2, and 3, the arm $h$ of the dog having trunnions $y$ projecting into slots $h'$ in the opposite sides of the said chamber $a$. In Fig. 1 the coupling-link D has passed through the flaring entrance $d$ of the chamber $a$, and is bearing against the front edge of the dog B, which supports the coupling-pin E, a projection, $e$, of the dog bearing against a shoulder, $f$, and the trunnions of the arm $h$ bearing on the bottom of the slots $h'$. On pushing the link farther into the chamber of the coupling-head the dog B will be moved to the position shown in Fig. 2, thereby permitting the coupling-pin to fall through the eye of the link to the position shown in that figure. A slotted plate, $m$, passes through an opening in the top of the coupling-head near the coupling-pin, and this plate is attached to or forms part of a plate, $n$, on which bears the collar $p$ of the said coupling-pin, the lower end of the plate $m$ bearing on the top of the dog, and the inclined rear edge of the latter bearing against the inclined back $x$ of the chamber $a$, while the link is maintained in a horizontal position, partly by the shoulder $q$ at the entrance to the chamber, and partly by the dog which is recessed at $u$ to receive the link. The weight of the coupling-pin, transmitted to the dog through the plate $m$, counteracts the leverage of the link, which retains its horizontal position, and consequently does not require an attendant to perform the dangerous duty of elevating the link and guiding it into the entrance of the coupling-head of an adjoining car. I propose in some instances to make the dog B of sufficient weight to counteract the leverage of the link, in order to retain the latter in a horizontal position, as above described, and in such a case to dispense with the slotted plate $m$.

The links of some cars are longer than others, and the long links must consequently penetrate farther into the coupling-head than the short links shown in Figs. 1 and 2, and the dog and coupling-head are especially constructed for the accommodation of such long links. When a long link, D', for instance, such as shown in Fig. 3, passes into the chamber $a$ of the coupling-head, it will strike the beveled front edge of the projection $e$ of the dog, and will consequently elevate the latter, and with it the plate $m$ and coupling-pin $e$, the inclined back $x$ of the chamber, and the correspondingly-inclined rear edge of the dog, also facilitating this vertical yielding movement of the latter under the action of the coupling-link, so that the penetration of the long link into the chamber cannot be impeded by the dog. In this case also the link is maintained in a horizontal position, partly by the dog, and partly by the shoulder $q$.

It will be observed, on reference to Fig. 2, that the rear portion of the flaring entrance $d$ of the coupling-head is comparatively narrow, so narrow in fact as to give the link but comparatively little vertical play, which it is desirable to avoid, owing to the character of the automatic coupling. The chamber $a$ at the rear of the flaring entrance, however, is of such capacity as to permit the link to be freely vibrated to either of the two extreme inclined positions indicated by dotted lines, which is an important feature of my invention, as this freedom of vibration prevents all risk of bending or breaking either the coupling-pin or link.

In the modification shown in Fig. 4 the coupling-head is of greater depth than usual, and has two entrances, $a$ and $a'$, so as to receive links of different altitudes, the dog being in this case of the duplex character illustrated too clearly to render an explanation necessary.

I am aware that a tilting block or dog has been used in connection with an automatic car-coupling, and I do not claim such block or dog, broadly; but

I claim as my invention—

1. The combination of a coupling-head, having an inclined bearing, $x$, with the loose dog B, adapted to the said inclined bearing, and constructed so that it will yield vertically to the direct action of either short or long links, as specified.

2. The combination, in a coupling-head, of a loose dog, B, the coupling-pin E, and a plate, $m$, through which the weight of the coupling-pin is transmitted to the dog, as set forth.

In testimony whereof I have signed my name to this specification in the presence of two subscribing witnesses.

JOHN J. LAHAYE.

Witnesses:
PHILIP H. HANTSCH,
F. D. NAGLE.